(12) United States Patent
Fujii et al.

(10) Patent No.: US 6,518,536 B2
(45) Date of Patent: Feb. 11, 2003

(54) JOINING EQUIPMENT

(75) Inventors: Koji Fujii, Osaka (JP); Jing Bo Wang, Hyogo (JP); Mamoru Watanabe, Hyogo (JP); Yasuhiro Goto, Hyogo (JP); Makoto Ryudo, Hyogo (JP); Kinichi Matsuyama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 28 days.

(21) Appl. No.: 09/822,990

(22) Filed: Mar. 30, 2001

(65) Prior Publication Data

US 2002/0008086 A1 Jan. 24, 2002

(30) Foreign Application Priority Data

Mar. 30, 2000 (JP) ........................................ 2000-093157

(51) Int. Cl.[7] ............................................... B23K 11/24
(52) U.S. Cl. ........................................ 219/110; 706/23
(58) Field of Search ................................ 219/109, 110; 706/20, 21, 23

(56) References Cited

U.S. PATENT DOCUMENTS

| | | | | |
|---|---|---|---|---|
| 4,596,917 A | * | 6/1986 | Nied et al. | 219/109 |
| 5,450,315 A | * | 9/1995 | Stefanski | 219/110 |
| 5,764,859 A | * | 6/1998 | Kim et al. | 219/109 |
| 6,018,729 A | * | 1/2000 | Zacharia et al. | 219/110 |
| 6,294,753 B1 | * | 9/2001 | Fujii et al. | 219/110 |

FOREIGN PATENT DOCUMENTS

| | | |
|---|---|---|
| JP | 52-94841 | 8/1977 |
| JP | 56-39181 | 4/1981 |
| JP | 56-109178 | 8/1981 |
| JP | 56-158286 | 12/1981 |
| JP | 59-61580 | 4/1984 |
| JP | 54-57440 | 9/1985 |
| JP | 1-216246 | 8/1989 |
| JP | 4-178275 | 6/1992 |

* cited by examiner

Primary Examiner—Clifford C. Shaw
(74) Attorney, Agent, or Firm—RatnerPrestia

(57) ABSTRACT

A joining equipment in which a neural network is employed for controlling a joining process. A dynamic analog model is used for neuron elements configuring the network. The equipment includes a detector, a controller, and a neural network. The detector detects a joining state of a joining portion when work pieces are joined with each other. The controller controls the output of the joining equipment. In response to output signals from the detector, the neural network transmits signals to the controller. Such a structure allows the joining equipment to flexibly respond to complicated changes in joining states. Besides, using similarity with a thermal conduction equation enables to minimize the number of input items fed into the neural network. Furthermore, using an approximate solution to the thermal conduction equation realizes to accelerate the time for numerical calculation without loss of accuracy.

23 Claims, 12 Drawing Sheets

JOINING EQUIPMENT

FIELD OF THE INVENTION

The present invention relates to the field of joining equipment and, more particularly, relates to joining equipment utilizing a neural network trained by results of welding tests through a learning process.

BACKGROUND OF THE INVENTION

Joining equipment for resistance welding and thermo pressure welding is widely used for joining steel plates and other metallic products. Keeping high quality at a welding zone has become increasingly valued in the joining process.

Conventional resistance welding mainly processed a soft steel plate-made work piece, so that a current abnormality was rarely observed. Consistently controlled welding conditions were able to steady the welding quality.

In recent years, however, galvanized steel plates and high-tension steel plates have been used a lot, instead of soft steel plates. It has been difficult to maintain a reliable welding due to such a diversity of materials to be processed.

In joining methods employed in the electrical equipment field, soldering has been gradually given way to welding, and particularly pressure welding for a greater joining-strength and a longer joining-life.

The challenge for such a case is to control the quality at a minute joining portion.

In this shifting climate, a breakthrough—realizing well-controlled joining quality with a higher accuracy—has been awaited.

To wrestle with the challenge, various methods mainly focused on the resistance welding have been developed, for example, (i) a method evaluating whether a joining state is acceptable or not after joining and, (ii) a method controlling joining quality during joining.

In the welding that is the mainstream of joining method, examples of methods that have been developed so far are described below. It will be noted that all the examples below belong to the method either (i) or (ii) described above.

1) calculating resistance between electrode tips from welding current and welding voltage, then evaluating whether a joining state is acceptable or not, according to the changing pattern. The typical example was disclosed in Japanese Patent Laid-Open No. 56-158286.

2) comparing the voltage between electrode tips with predetermined changes in time of a reference voltage to obtain a difference between them. According to whether the difference is in an acceptable range or not, evaluating a joining state that should be acceptable or not. The typical example was disclosed in Japanese Patent Publication No. 59-14312.

Furthermore, according to voltage between electrode tips, extracting the active component that effectively contributes to the exothermic heat at a welding portion, and calculating the integral in time of the active component to evaluate a welding state to be good or not. Such examples were disclosed in Japanese Patent Publication No. 59-40550 and Japanese Patent Laid-Open No. 59-61580.

3) detecting a heat generating temperature and, according to the pattern that indicates changes in temperature, evaluating whether a welding state is good or not. The typical example was disclosed in Japanese Patent Laid-Open No. 1-216246.

4) passing ultrasound between work pieces to obtain the amount of the transmission, from which a welding state is evaluated to be acceptable or not. The typical example was disclosed in Japanese Patent Laid-Open No. 52-94841.

5) utilizing positional displacement of the electrode tip observed during welding to control the welding quality. The typical example was disclosed in Japanese Patent Publication No. 60-40955.

6) detecting welding current flowed during welding to determine the limits, and monitoring the limits to obtain a welding state with consistently good quality.

7) calculating a nugget diameter with a thermal conduction model by a computer.

8) calculating the temperature distribution of a base-metal, from which a nugget diameter is estimated. At the same time, correcting the temperature distribution according to the amount of movement of electrode tip observed during welding. Unlike the methods 1) through 7), this is to directly control a welder. The typical example was disclosed in Japanese Patent Publication No. 7-16791.

Now will be discussed problems to be tackled in the methods 1) to 8).

In the 1) method, deformation at the top of the electrode tip caused by the pressure, non-effective shunt current occurred there, or galvanized steel plate-work piece can cause resistance between the electrode tips having inconsistent changing pattern. This makes difficult to monitor the quality of welding results.

In the 2) method, each time the welding state varies, for example, deformation of electrode tips caused by the pressure or variations in plate thickness, the condition for evaluating welding results has to be adjusted to the changed state. Therefore, for practical use, it is difficult to monitor, with accuracy, the quality of welding results.

The next 3) and 4) methods contain some problems—installation of a heat detector and an ultrasound transmitter/receiver—inapplicable to on-the-spot welding work.

The 5) method also has problems inapplicable to practical use, for example, (i) installation of a displacement-measuring device; (ii) a noise-intrusion problem; (iii) difficulty in measuring minute displacement; and (iv) an individual difference between resistance welders in mechanical strength. These could be obstacles for on-the-spot welding work.

As a potential solution to (i), a method has been under review. According to the method, the positional displacement of the electrode tip is detected from an output of a position-detecting encoder attached to a servomotor in a servomotor-driven pressurized system. In this case, the displacement-measuring device is not required.

With the method, however, a delay in response of an encoder output, and flexure of materials caused in relation to the mechanical strength of a pressuring mechanism could hamper the displacement measuring with accuracy for practical use.

The method described in 6) is economical and easily practicable. It is effective at detecting a power failure or a break occurred in a secondary conductor. As mentioned above, there are problems inherent in welding work—deformation at the tip of the electrode tip caused by the pressure and non-effective shunt current occurred at the electrode tip. Those make current density dropped. Such quality degradation at a welding portion due to the dropped current density cannot be detected by the method.

According to conventional methods discussed so far, monitoring or controlling welding quality need a painstaking preparation work described below, demanding much effort and experience.

a) carrying out an on-the-spot preparatory experiment on a welding material basis. According to the results, the relation between criteria for evaluation and welding quality is predefined.

b) electrode force, welding current, and welding duration are the welding condition-determining elements. Taking the complicate relationship into account, the criteria for evaluation should be defined.

Although the 7) method does not need the preparatory experiment and is widely applicable, it takes much time to solve a thermal conduction equation.

The 8) method, whose concept is extended from the 7) method, employs the amount of movement of electrode for controlling welders. This inconveniently raises the same problems as those in the 5) method. Besides, if the welding position locates at the edge of a work piece or, if work pieces to be welded each other do not fit snugly, the method could not be applied to such situations.

SUMMARY OF THE INVENTION

The present invention therefore aims to provide joining equipment capable of responding to complicated changes in joining states caused by various factors complicatedly involved with each other. The joining equipment of the invention utilizes a neural network to control the joining process.

It is also an object of the invention to provide joining equipment with the learning process for controlling being economical and simple. To realize this, the equipment should be capable of: solving approximately the thermal conduction equation derived from a physical model while an assessed accuracy is being kept; accelerating numerical-calculation time to obtain a faster control speed; reducing the cost required for numerical calculation.

It is another object of the invention to provide joining equipment employing a neural network system for a well-controlled joining. To realize this, the system should: employ a dynamic analog model for a neuron element; utilize the affinity between an output from a neuron and the solution to the thermal conduction equation; suppress the number of input items to the neural network; keep a control with a higher precision by minimizing an error in output data from the network even at fewer number of learning items.

It is also an object of the present invention to provide joining equipment that calculates the strength at a joining portion directly representing its joining quality and then controls the welding according to the calculated characteristic value of joining strength.

It is another object of the present invention to provide joining equipment in which, on the welding site, a joining controller can be easily handled and its working state can be checked at any time during welding.

In order to realize the objects above, the joining equipment of the present invention includes:

i) a detector detecting a joining state of work pieces to be joined when joining;

ii) a controller controlling an output from joining equipment; and ii) a neural network transmitting signals to the controller. An output signal from the detector is fed into the input layer of the controller. An output of at least one of neurons configuring the network is returned back to the input of the neuron.

In addition, the neural network works for the solution similar to the solution of the thermal conduction equation representing a welding phenomenon.

In the welding that is the mainstream of joining, disclosed here is a joining equipment aimed at accomplishing the objects described above.

DESCRIPTION OF THE PREFERRED EMBODIMENTS

Figure 1:
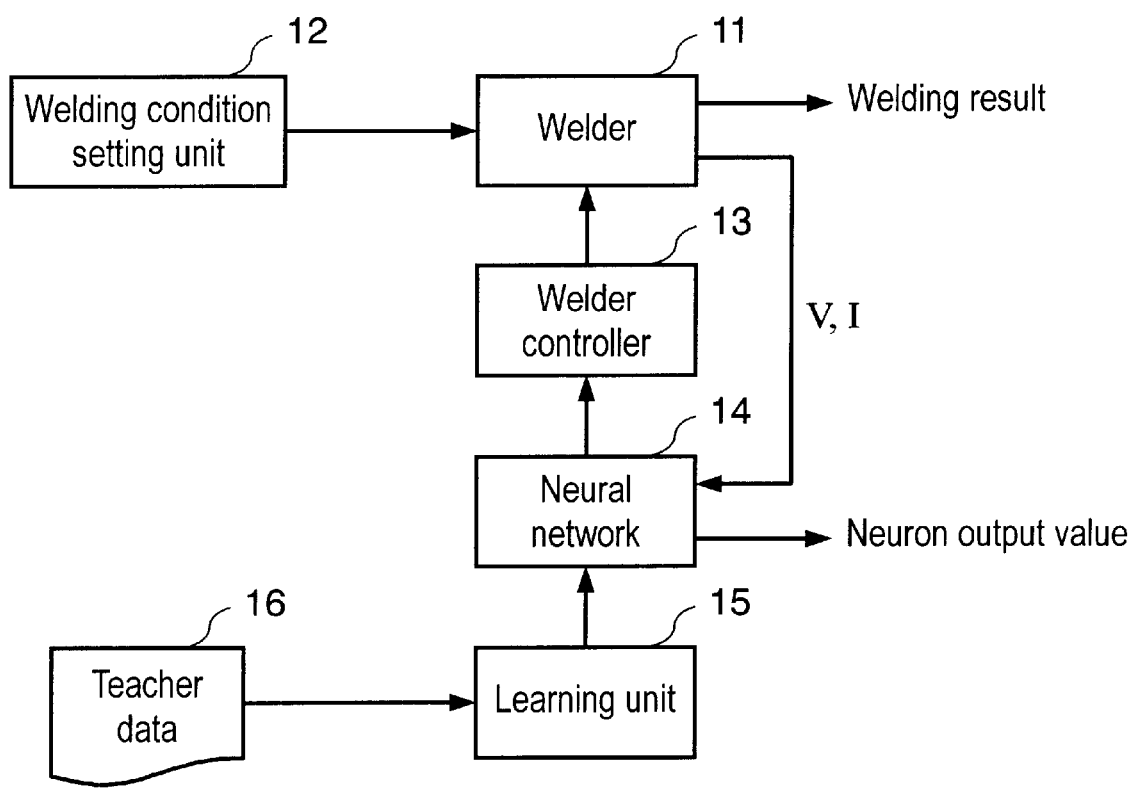
FIG. 1 is a block diagram indicating the system configuration in accordance with a first preferred embodiment of the present invention.
Figure 2:
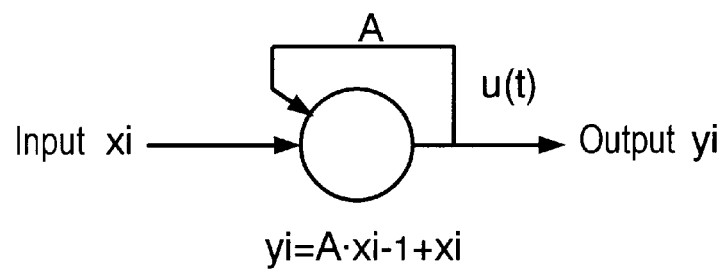
FIG. 2 illustrates a dynamic analog model that returns an output of a neuron back to as an input of the neuron.

The principle of the present invention will be generally described prior to the description of each preferred embodiment. Each embodiment of the present invention has a detailed description of welding that is the mainstream of joining method and welder (welding equipment) as joining equipment.

As described above, in an quality inspection for a joining portion and the controlling technology, there are problems to be solved for practical use. To address such problems, according to the joining control of the present invention, a feedback-type neural network technology is applied to welding control, in addition to a conventional feed-forward type.

A neuron is the fundamental element of a neural network. The neuron in the present invention employs a dynamic analog model, in which a neuron output is returned back to an input of the neuron. (See P. 9 to 20, Y. Uesaka, *Mathematical Funamentals of Neuro-Computing*, Kindai-Kagaku-sya, July 1997.)

The dynamic analog model can provide input history records. That is, employing the dynamic analog model, thermal history records fed into a joining portion (welding zone)—joining (welding) quality-determining primary factor—can be reflected on evaluation of joining (welding) quality. For this reason, in the neural network used for the present invention, the feedback-driven dynamic analog model is employed for the input layer accepting various data that relate to heat input to the welding zone.

According to the present invention, a thermal conduction equation is applied to a resistance welder. In this case, for accelerated calculation time and a reduced cost for numerical calculation, the thermal conduction equation is solved as the following procedure.

The thermal conduction equation is shown as the equation (a) below.

$$\frac{\partial T}{\partial t} = \nabla(k\nabla T) + \frac{\rho}{C\sigma}\delta^2 \quad (a)$$

where $\rho$ is specific resistance and $\delta$ is current density.

The following equation is derived by representing the equation (a) in a discrete form.

$$T(N) - T(O) = k\nabla T \frac{\Delta t}{\Delta l} + \frac{\rho\delta^2}{C\sigma} \quad (b)$$

The equation (b) means that the temperature change in the left side is represented by the summation of:

the heat movement change in the first term of the left side, and the heat-up by heat input in the second term of the right side.

Herein, assuming that the heat moves and changes similarly in shape in the first term of the right side, the following equation is derived.

$$\nabla T = -\alpha T(0) \quad (c)$$

Herein, $R = \rho l/S$, $V = I \cdot R$

As a result, the following equation for seeking the temperature at welding zone is obtained:

$$T(N) \cong (1 - \alpha \cdot k \cdot \Delta t/\Delta l)T(0) + (\Delta V \cdot I \cdot \Delta t)/(c \cdot \sigma S \cdot \Delta l) \quad (1)$$

where T(N) is the temperature at the center of a weld zone;

T(0) is the temperature at the center of the weld zone measured time $\Delta t$ before;

$\alpha$ is the constant on the assumption that the heat moves and changes similarly in shape;

k is thermal conductivity for a work piece;

$\Delta l$ is thickness of a weld zone;

C is specific heat of a work piece;

$\sigma$ is density;

S is a current path area;

$\Delta V$ is voltage for joining (welding voltage) applied to the welding zone;

I is current for joining (welding current) fed through the welding zone.

That is, the temperature T(N) of the weld zone at a certain time is represented as a summation of the weld zone temperature at very little time $\Delta t$ before (the first term of the right side) and heat-up by the heat input during $\Delta t$. Herein, the second term in the parenthesis of the first term of the right side represents the heat movement change.

Herein, $\alpha$ is determined for each base-metal by the experiment.

With equation (1), the temperature in a welding zone can be obtained in a single-step calculation, by which the calculation time is accelerated higher than that required for the prior art calculation. This also promises a reduced cost numeric calculation.

A general solution to a dynamic analog model is given by equation (2) below. (See Eq. (13), P. 19, Y. Uesaka, *Mathematical Funamentals of Neuro-Computing*, Kindai-Kagaku-sya, July, 1997.)

A solution to the thermal conduction equation for a thermal conduction model of a resistance welding zone is given by equation (3) below. (See Eq. (6.17), P. 235, T. Ouji, *Fundamental of Welding and Joining Process, Selection on welding and joining Vol.* 1, Sanpo-publishing, June, 1996.)

As is evident from equations (2) and (3), the fundamentals for the solutions to these equations have the same form each other.

$$u(t) = \tau V(1 - \exp(-t/\tau)) \quad (2)$$

where $\tau$ is a time constant, V is an external input.

$$Tc/To \cong 32/\pi^3 \times (1 - \exp(-t/\tau)) \quad (3)$$

where $\tau$ is a time constant, Tc is the temperature at the center of a welding zone, To is the maximum temperature in the welding zone.

The internal potential (output) of a dynamic analog model is assumed to be a parameter for the state in temperature at a welding zone.

Suppose that welding conditions, such as (i) a small range of variation in current path diameter in a welding zone; (ii) a negligible change in thickness of a welding zone, are provided. Under such limited conditions, it can be assumed that at least current for joining (welding current) and voltage for joining (welding voltage) will do for the input elements to a neural network.

In the case that any factor that affects the welding state is found prior to welding, the factor can be added to the input elements for the neural network.

This method makes a well-configured neural network system easily prepared before welding, appropriately matching with a joining state (welding state), for example, the shape of a work piece, and the shape of an electrode.

The explanation above has been described taking a case of utilizing a similarity between a solution to a thermal conduction equation in resistance welding and a general solution to a dynamic analog model. This is also applicable to other factors—light, heating by laser, convective heating with a heated tool, providing another neural network based on the same similarity. That is, by replacing the current and voltage, which function as the factors in resistance welding, with heat generated by light input, a radiation diameter, a tool temperature in convective heating. Thus, as is the case in resistance welding, another neural network can be established with ease. In this case, not only a variety of input items, but also the number of items that should be learned for the control by the neural network can be specified.

Figure 3:
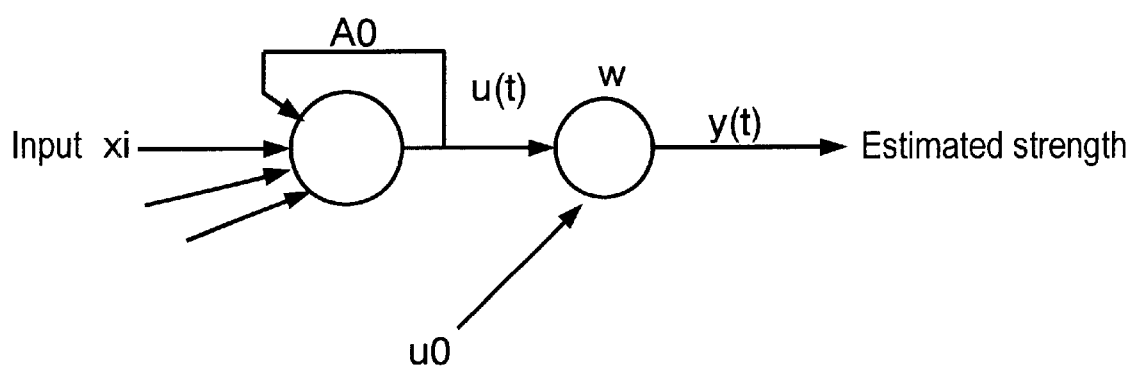
FIG. 3 is a neuron block diagram in the case that the welding control is performed with welding strength.

The joining control (welding control) is performed employing joining strength (welding strength) that represents joining quality (welding quality). Therefore, the neural network utilizes the neuron form shown in FIG. 3. Using a dynamic analog model, the output (internal potential) of the neuron element is obtained by solving equation (4) as a difference equation.

$$u(t+dt) = A_0 \cdot u(t) + x_i \quad (4)$$

where $A_0$ is a the feedback factor, $x_i$ is the amount of input change. The output will be represented by Sigmoid function, for example, the function that satisfies the equation (5) below.

$$y = B/(1 + \exp(-(u - u_0)w)) \qquad (5)$$

With equations (4) and (5), the relationship between welding current and welding voltage contained in the teacher data supplying to a dynamic analog model, and welding strength of the teacher data is fed into the neural network so that the network learns the relationship. Saturated strength at a welding zone determines B in the equation. By solving simultaneous equations derived from learning results, the unknown parameters, $A_0$, $u_0$, and w are defined. The output value obtained from the dynamic analog model employing equations (4) and (5) corresponds to welding strength. With the value used as a reference, it will be able to perform the welding control with welding strength being optimally controlled.

Such configuration also enables the data of welding strength for teacher data to be fed into the neural network through a learning process.

As described above, a dynamic analog model can be used for controlling by incorporating it into a neural network and giving limitations to welding procedures to be controlled thereunder.

To apply the control much more extensively for various work pieces, the dynamic analog model described above will need to be corrected.

Physical constants for a work piece can be changed through the following methods.

a) changing a physical constant factor that affects the internal potential of a dynamic analog model, according to the extent of the internal potential's variation.

b) changing the constant according to a welding-zone temperature determined by other detecting method, for example, a welding-zone temperature derived from a thermal conduction equation, or a welding-zone temperature evaluated from thermal image data.

c) shape variations in work pieces—a change in thickness of a welding zone is correctable by detecting the amount of movement of electrode and the amount of change in electrode force.

d) current path areas—can be determined according to a welding-zone temperature, the specific resistance value at the temperature of the work piece to be processed, and the resistance value at the welding zone from the current and voltage applied at the moment.

The following events can be also useful for detecting condition changes of the welding zone for welding control.

i) a change in sound at welding; ii) light generated at welding; iii) a change in composition of a material estimated from a change in sound at welding; iv) the distribution of temperature at the welding zone.

The temperature distribution mentioned in iv) can be obtained from, for example, the amount of movement of electrode, and the method was disclosed in Japanese Patent Publication No. 7-16791 mentioned earlier.

With the methods for changing physical constants described above, the constant α in equation (1) can be appropriately corrected for each joining material (welding material).

A destructive inspection for weld zone has been mainly conducted to check whether the welder properly works or not on the welding site. Doing it takes a great deal of expertise derived from practical experience. On-the-spot evaluation has therefore not been an easy work.

As described earlier, an output (internal potential) of a dynamic analog model incorporated in a neural network shows a value pertinent to saturated strength at a weld zone. The internal potential fed out from the neural network is determined as a welding evaluation index.

Examining a change in color at the welding zone during welding, the welding evaluation index-to-change in color correspondence table is prepared. The inspection based on the correspondence table provides a good grasp of on-the-spot welding.

Furthermore, the quality check of welding procedure may be conducted in such a way that the image representing the welding zone, which has been subjected to the image process, is evaluated according to color information. This makes possible to check on the progress of welding while the welder works.

Besides, the correspondence table is useful to ensure high and consistent welding quality. If the welding evaluation index or the change in color is out of its acceptable range as shown in the table, welder or other equipment and the work piece in process can be checked whether something wrong happened in the process.

Now will be described a case employing a dynamic analog model for controlling welding of a weld zone.

As explained above, the internal potential of a dynamic analog model serves as an evaluation index for a weld zone. In this case, the internal potential is given as a function of time.

In resistance welding, the welding evaluation index depends on the amount of heat input, i.e., welding current and welding voltage. This is also true in the welding employing light or laser.

Welding current in resistance welding can be set as an external input. On the other hand, welding voltage can be represented as a function, with the welding current given as a variable, while the welding process is being monitored.

As the welding procedures, referencing the welding zone-evaluation index calculated, a predicted value of the welding zone-evaluation index on the completion of welding is calculated from employing the welding-current value at predetermined time in progress and a predicted value of welding voltage represented with the welding current given as a variable.

If the predicted value differs from the target value of the welding zone-evaluation index as a goal on the completion of welding, the welding current is changed to get closer the two values.

The comparison of the two values can be a guide for determining the period of welding time: if the welding zone-evaluation index exceeds the target value before a predetermined ending time, the welding may be curtailed; if the index will not reach the target value by the predetermined ending time, the welding may be extended.

Performing the comparison between the two values over and over again until the predetermined ending time allows the predicted value to reach closer to the target value on the completion of welding. If the difference between the two values persists, the welding time should be adjusted, setting it slightly longer or shorter.

First Preferred Embodiment

Hereinafter will be described the first preferred embodiment of the present invention.

Figure 4:
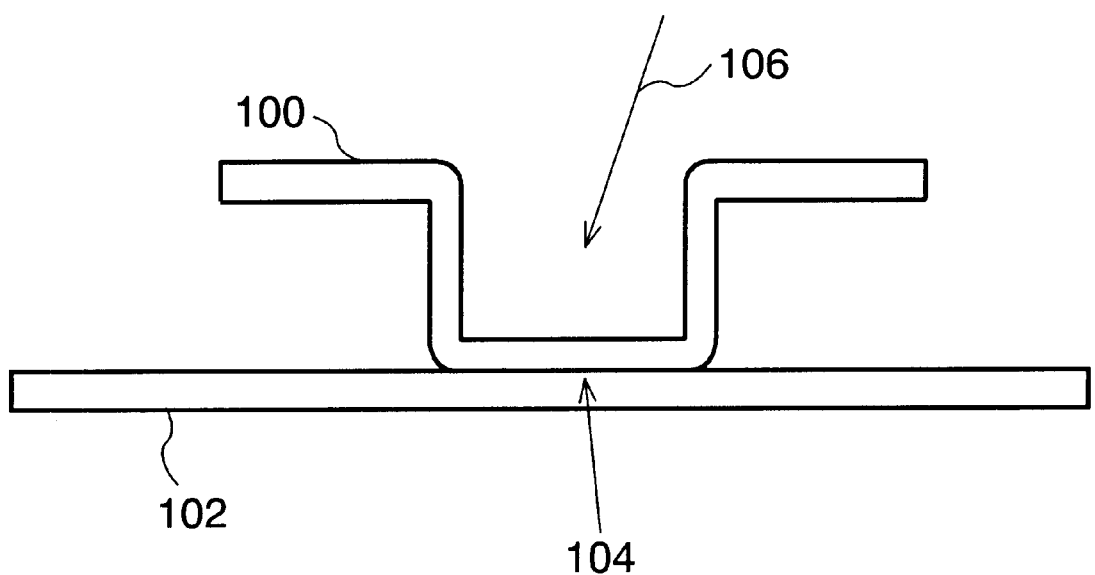
FIG. 4 shows the shape of work pieces described in the first preferred embodiment.

In resistance projection welder 11 (hereinafter referred to as welder 11) shown in FIG. 1, welding zone 104 of work pieces 100 and 102 shown in FIG. 4 is sandwiched with electrodes (not shown), and applied pressure by a pressuring mechanism (not shown) for projection welding.

Welding condition-setting unit 12 determines joining conditions (welding conditions), and predetermines specifications for aimed-welding quality and prepares teacher data 16. Welder controller 13 provides welder 11 with instructions for welding in response to the output value from neural network 14. In the embodiment, controller 13 controls welding current.

Herein, welder 11 includes a detecting portion (not shown). The detecting portion observes and detects joining states (welding states) at the joining portion (weld zone).

Neural network 14 comprises a single neuron of the dynamic analog type, accepting welding voltage V and welding current I used for welding from welder 11.

Teacher data 16 is fed into learning unit 15, where an output target value and a feedback coefficient for neural network 14 are defined. These values are set into neural network 14.

Now will be described the working principle according to the embodiment.

Welding condition-setting unit 12 changes the combination of welding current, welding duration, and electrode force—hereinafter referred to these three factors as welding conditions. Teacher data 16 employs the data having achieved temperature at the weld zone.

As other factors to determine teacher data 16, information on discoloration due to burns on the surface of welding zone 104 may be available. When using the information, the welding zone should be examined, from the direction indicated by arrow 106 in FIG. 4, for a discolored area on its surface.

In addition to changes of welding voltage and current for a certain electrode force, changes in dimension of welding zone is also effective to teacher data 16.

Besides, the weld zone 104 reaches at high temperature and then emits light. The light is also usable as teacher data 16. In case of laser welding, the laser-reflected light at the laser-welded zone is also effective to teacher data 16.

The detecting portion detects the data above described.

Learning unit 15 captures teacher data 16 therein. Employing a group of data having similar welding results and solving simultaneous equations, unit 15 derives a feedback coefficient.

The target value of neuron output required for control is obtained from the following ways.

i) after the calculation of the feedback coefficient, learning unit 15 may review teacher data 16 and determine the target value being in the range of neuron output values with good welding results, for example, acquired by evaluation of tensile strength.

ii) in reverse, determining the target value, the feedback coefficient may be adjusted so that the predetermined target value is to be the output data.

Figure 5:
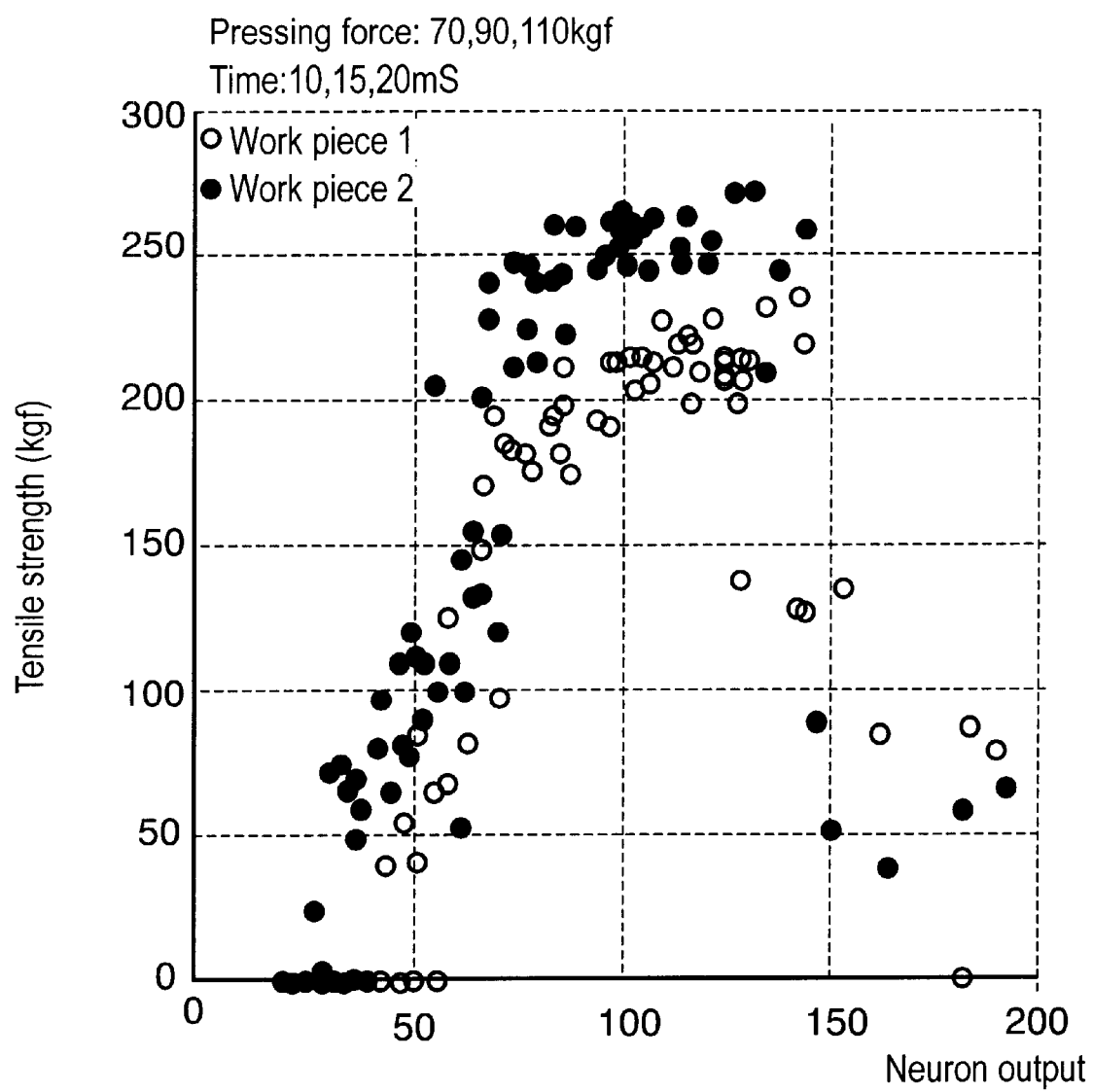
FIG. 5 shows the relationship between a neuron output value and welding result (i.e., welding strength) of work pieces.

FIG. 5 shows the relationship between the target value of neuron output and tensile strength that is the key to good result of welding.

In the embodiment, referencing to FIG. 5, the range of neuron output in which a desirable tensile strength is provided. As is apparent from the figure, the target value of neuron output is set at 90 with the preferable range of neuron output provided +/−20.

Figure 6:
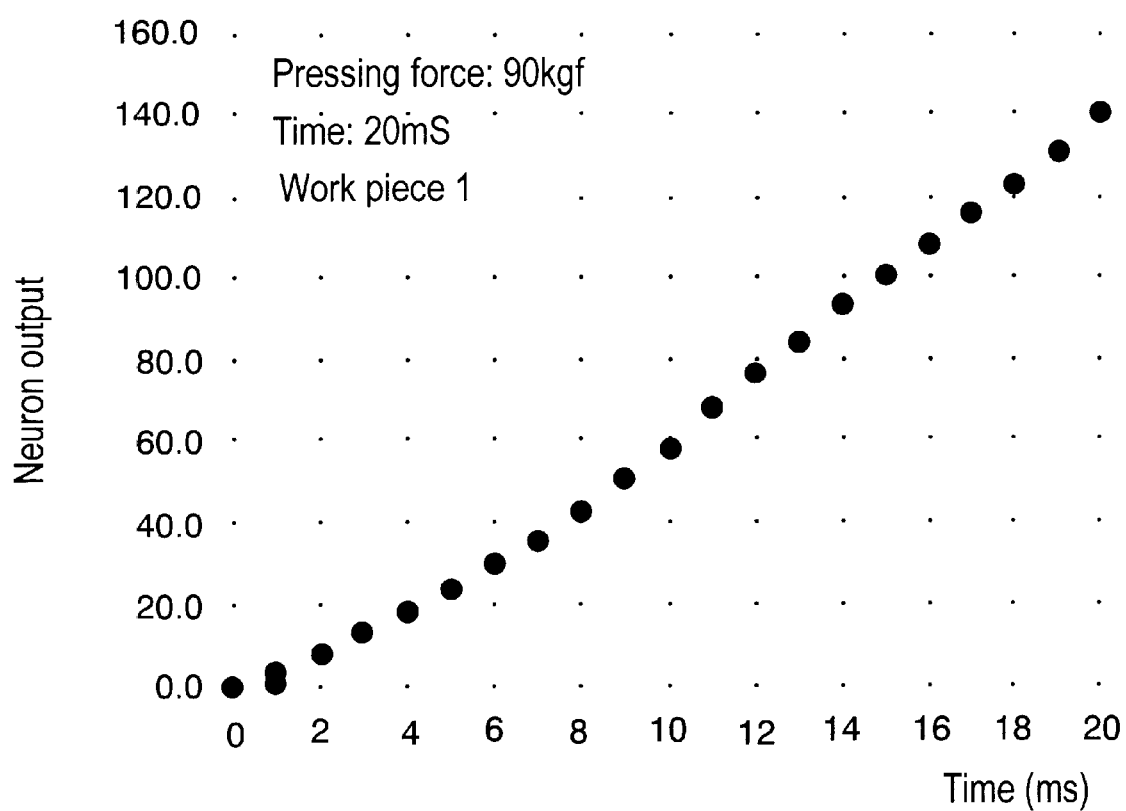
FIG. 6 shows an example of neuron output.

FIG. 6 shows an example of neuron output from the start of welding until the end of welding.

The values determined by learning unit 15 are fed into neural network 14, which completes preparation for welding.

While welding is in operation, neural network 14 outputs the difference between the target value of neuron output and a neuron output, which is fed out during the work shown in FIG. 6. The difference is entered to welder controller 13. Receiving the data, controller 13 changes welding conditions for welder 13 to eliminate the difference, so that the desired welding result is provided.

According to the embodiment, welding current I is changed to change welding conditions.

When the duration of welding is used for changing welding conditions, the welding work may complete at the time the neuron output reaches the target value of neuron output. In this case, the target value given only at the completion of welding is important. The characteristic of the value during the work is not required to be monitored.

Electrode force may be used for the parameter for changing welding conditions. In this case, the same effect as the case described above is expected if the response of a pressuring system is faster.

Second Preferred Embodiment

Now will be described the second preferred embodiment of the present invention.

Figure 7:
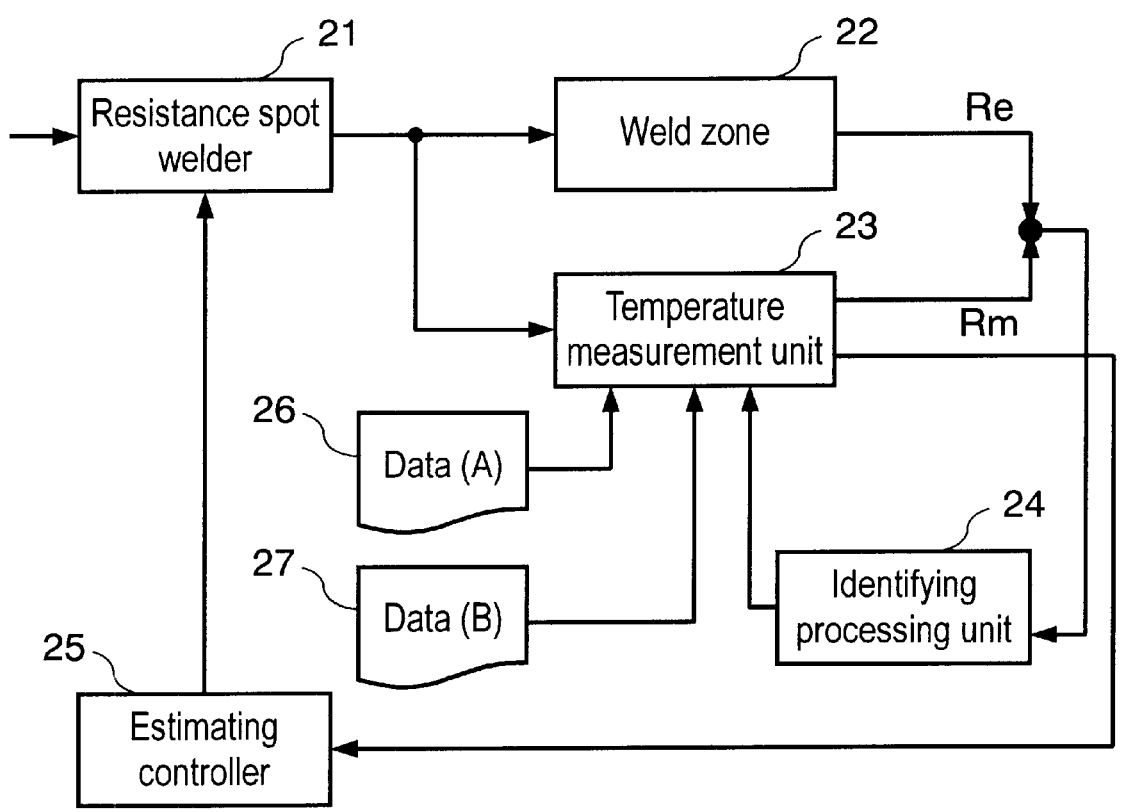
FIG. 7 is a block diagram indicating the system configuration in accordance with a second preferred embodiment of the present invention.

In resistance spot welder 21 shown in FIG. 7, welding zone 22 of work pieces is sandwiched between electrode tips, with application of pressure and heat, to generate a nugget. Temperature measurement unit 23 calculates the temperature at a weld zone, employing the voltage and current applied to weld zone 22, data (A) 26 indicating specific resistance characteristics in a work piece, and data (B) 27 indicating specific heat temperature characteristics.

Herein, welder 21 includes a detecting portion (not shown). The detecting portion observes and detects welding states at the weld zone.

In addition to that, unit 23 calculates resistance between electrode tips Rm.

Comparing calculated Rm with measured resistance between electrode tips Re, identifying processing unit 24 determines a current path diameter dc and supplies it to unit 23.

Estimating controller 25 controls the current and voltage applied to resistance welder 71 according to the weld-zone temperature calculated at unit 23.

Now will be described the working principle according to the embodiment.

Figure 8:
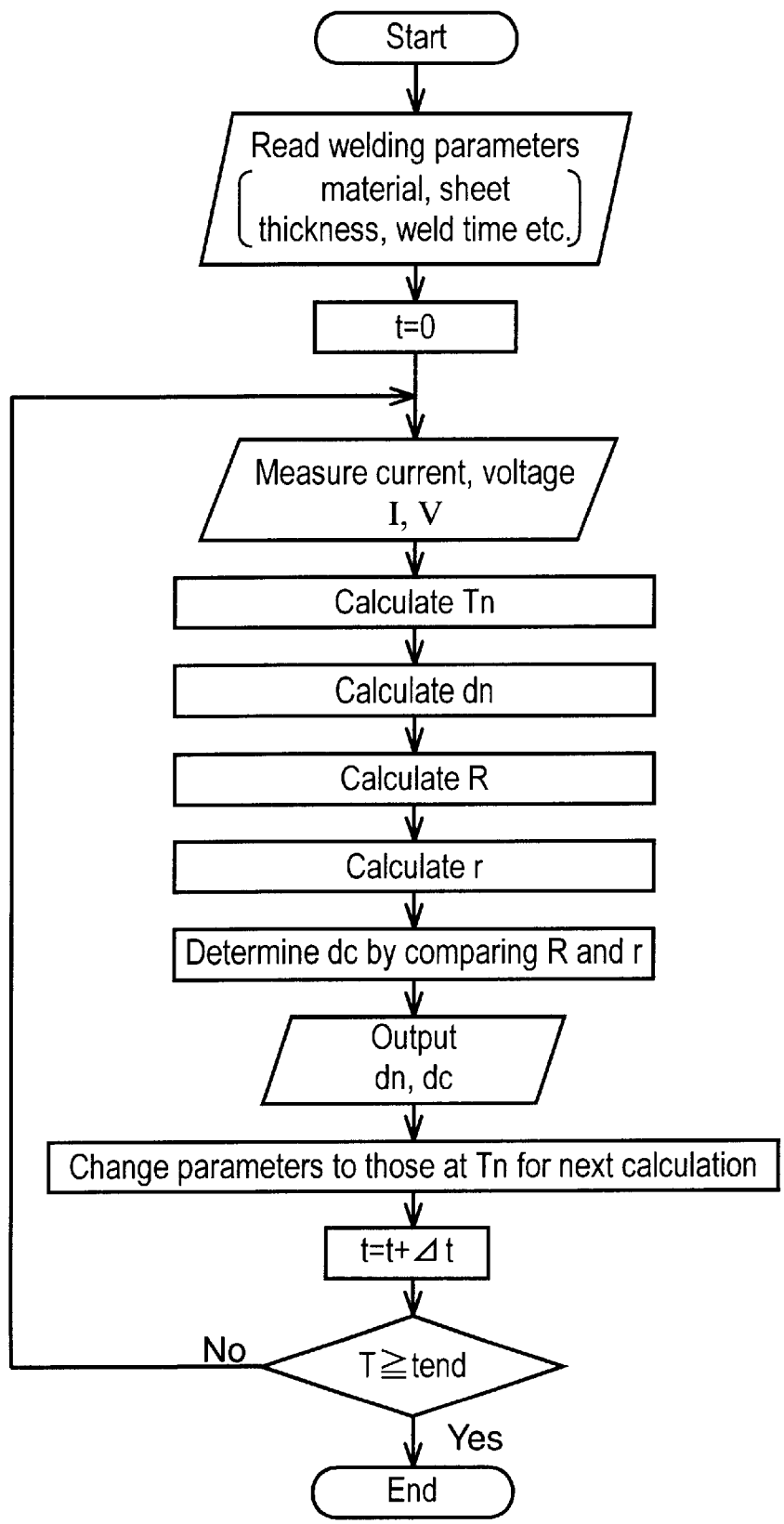
FIG. 8 is a flow chart indicating welding procedures in accordance with the second preferred embodiment of the present invention.

FIG. 8 is a flow chart indicating the working principle of the embodiment. Referencing to FIG. 8, the control sequence of welding operation will be described.

At the start of welding, the temperature at welding zone T0 is set at 20° C. Substituting the values of data (A) 26 and (B) 27, current, and voltage into equation (1) yields the internal temperature T1.

The current path area S in equation (1) is found in such a way that its diameter dc measures 6 mm as an initial value upon welding. After the calculation of temperature, the resistance value R at the welding zone is obtained from measured voltage and current, then the resistance value r is obtained by calculation.

$$r = \rho \times l / S \qquad (6)$$

where ρ is specific resistance, l is a thickness at a welding zone, S is a current path area. Then the resistance value R at the welding zone and measured resistance value r are compared in magnitude. The result determines the value of diameter dc: (i) when R>r, the value of dc should be decreased; (ii) R<r, the value of dc should be increased; (iii) R=r, the calculation cycle is continued with the value of dc having no alteration.

Unlike the initial setting of T0, calculated internal temperature, T1 is given to T0 for the next calculation. Data (a) 26, i.e. specific resistance characteristics in a work piece and data (B) 27, i.e. specific heat temperature characteristics are given values measured at temperature T1, and the value determined in the previous calculation is for diameter dc, while newly measured values are used for voltage and current.

The density, the thickness of a weld zone, and the thermal conductivity, which are required to equation (1), are contained in the welding condition factors given at the start of the procedure.

With the same procedure as the previous calculation, T2 is calculated and dc is determined by comparing measured resistance value R and calculated resistance value r. If the welding work does not complete, the control sequence continues the next cycle. To calculate a time-varying temperature at the weld zone, the loop will execute until the welding work is over.

Herein, the coefficient $\alpha$ may be adjusted based on the output of temperature measurement unit 23.

Figure 9A:
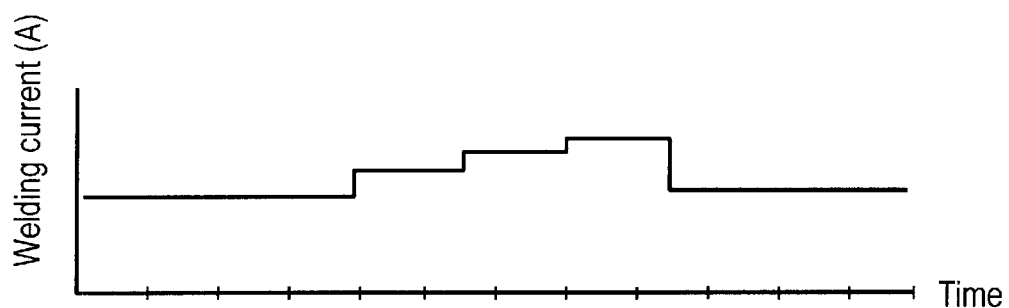
FIGS. 9A and 9B illustrate how to control in the welding in accordance with the second preferred embodiment.
Figure 9B:
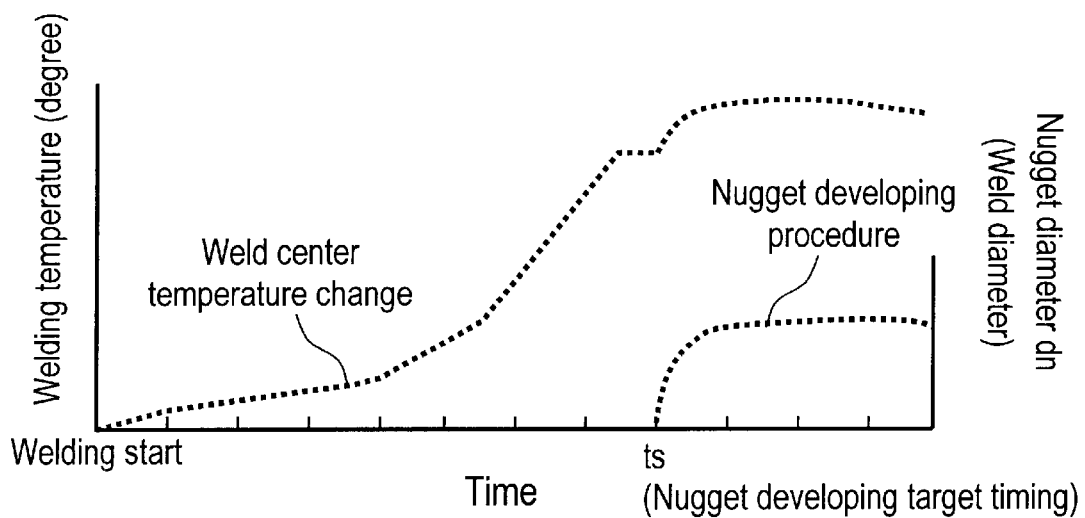

FIGS. 9A and 9B are graphs that illustrate a well-controlled nugget production according to changes in temperature at a welding zone. Temperature measurement unit 23, as shown in FIG. 9B, continuously calculates the temperature at the center of the welding zone with the calculation procedure described above. The nugget was produced on target time ts by controlling welding current appropriately, as shown in FIG. 9A, according to temperature variations.

Figure 10:
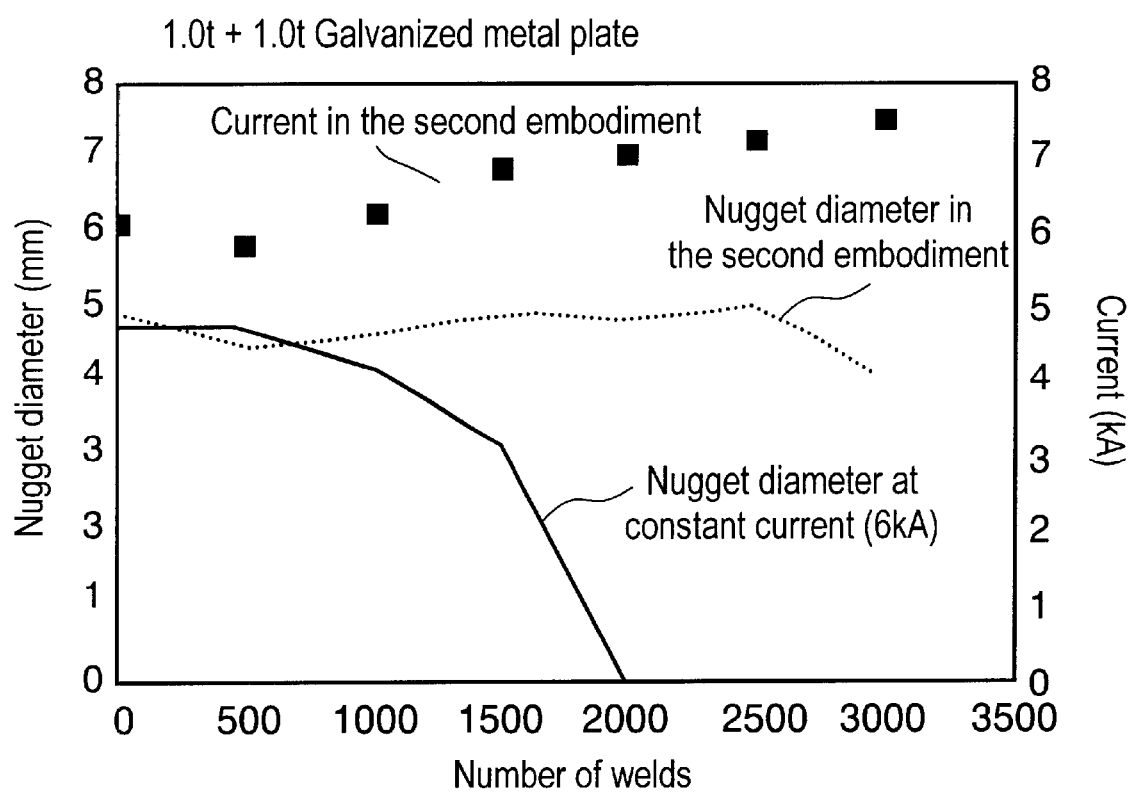
FIG. 10 shows the relationship between changes in welding current and changes in nugget diameter as the number of weld increases.

FIG. 10 shows the relationship between changes in current and changes in nugget diameter a the number of weld increases.

The prior art constant-current welding has the traditional limit of nugget production by the time the number of weld gets into the range of 1500 to 2000 due to wear of the electrodes. With the method of the embodiment, however, nuggets can be still produced over 3000 times of weld, which means the electrode life extremely increased.

In this example, welding current increased from approx. 6 kA at the start of welding up to 7.5 kA at approx. 3000 times of weld.

Besides, a low-cost CPU will do for temperature measurement unit 23 of the embodiment, instead of an expensive device equipped with high-speed numeric calculation ability.

In the embodiment, calculated temperature was controlled so as to reach the target temperature on the target time. In this case, the target temperature is based on the melting temperature of steel plates.

As an additional effect, controlling an increasing rate of the calculated temperature effectively suppresses weld expulsion occurred during a welding work.

Third Preferred Embodiment

Now will be described third preferred embodiment of the present invention.

In the actual welding site, an error in dimension or shape of each work piece, or variations in dimension due to deformation occurred in pressing often forces the welding work to weld with an edge portion of a work piece.

The welding work at the edge portion of a work piece differs from the work at a normal (that is, not at the edge) position of a work piece in terms of thermal capacity, exothermic distribution. Therefore, providing the same welding condition as that applied to the welding at a normal position can cause a extreme deformation or weld expulsion, degrading welding quality. To handle such a situation and get a higher welding quality, welding conditions should be changed so as to be suitable for each situation.

The embodiment makes use of a neural network in coping with the situation. The neural network estimates a position to be weld and automatically changes welding conditions according to the state. An important point in the estimation is whether or not the position to be weld locates at the edge of a work piece. The neural network employs changes in electrode force as a guide for the estimation.

Now will be described the system and its working principle of the embodiment.

Figure 11:
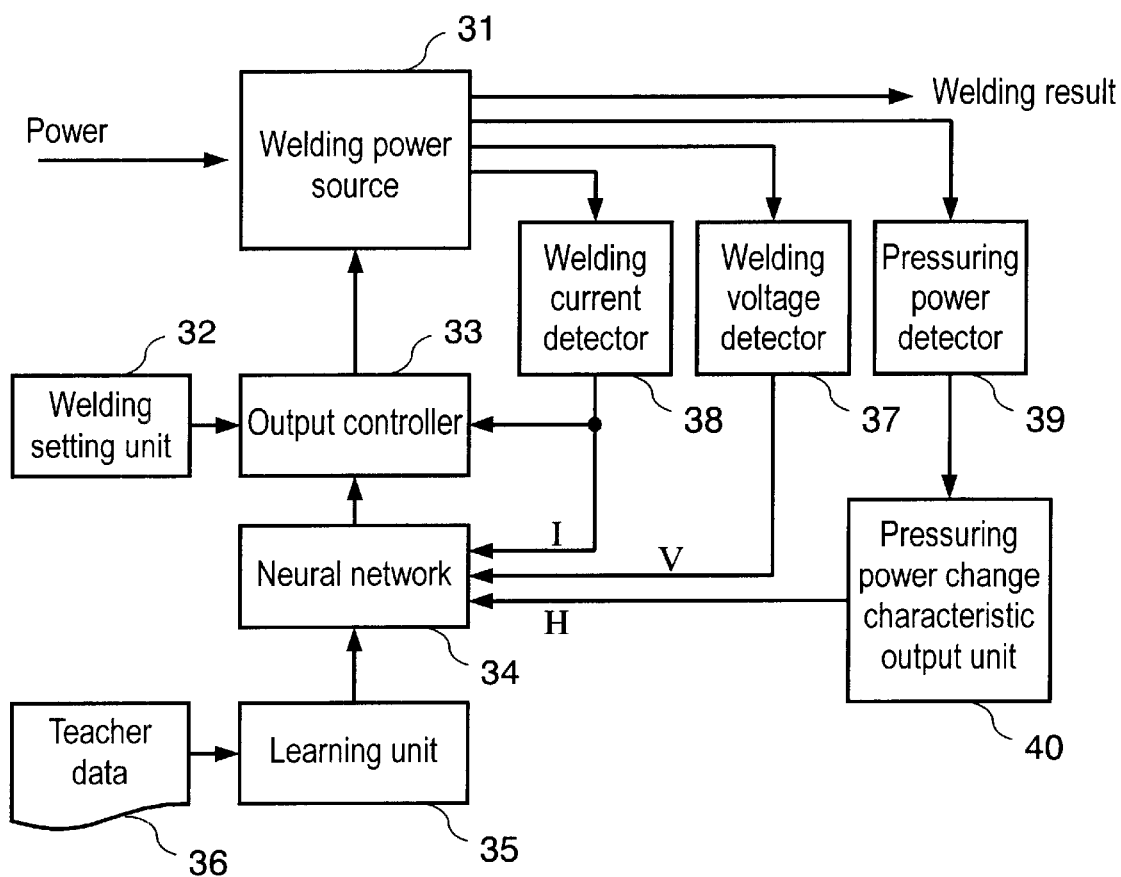
FIG. 11 is a block diagram indicating the system configuration in accordance with a third preferred embodiment of the present invention.

In FIG. 11, welding power source 31 contains a pressuring section. Neural network 34 outputs calculation results to output controller 33, which controls welding power source 31.

Employing teacher data 36, learning section 35 calculates a feedback coefficient and a weighted coefficient for the neural network.

Welding voltage detector 37, which works as a joining voltage detector, detects welding voltage, while welding current detector 38, which works as a joining current voltage detecctor, detects welding current.

Pressuring power detector 39 detects changes in electrode force generated during welding. Receiving pressuring power change characteristic from detector 39, pressuring power change characteristic output unit 40 calculates the value measured at a predetermined time interval since the welding has started. The calculated result is sent to neural network 34. Welding setting unit 32 sets the welding condition for output controller 33.

Welding power source 31 sandwiches a steel plate—or aluminum plate—made work piece (not shown) with its pressuring section (not shown) and performs resistance welding by applying welding current according to the welding instruction from welding setting unit 32. Welding current detector 38 detects welding current applied to the welding zone. Welding voltage detector 37 detects welding voltage occurred in the work piece and transmits it to one of neurons in the input layer of neural network 34.

The signals from the built-in sensor (not shown) of the pressuring section are fed into pressuring power detector 39. Furthermore, output unit 40 sends the results calculated with the values measured at a predetermined time interval from the start of welding—pressing force change characteristic H—to a different neuron in the input layer of neural network 34.

Now will be described the configuration of neural network 34.

Figure 12:
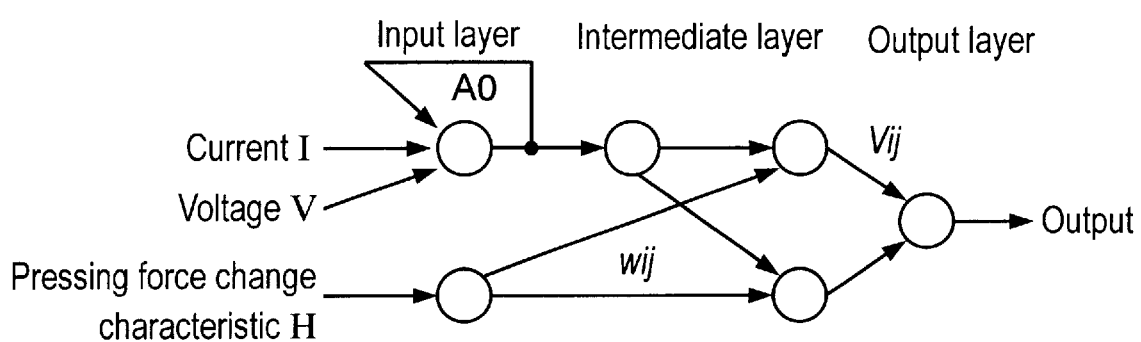
FIG. 12 shows the neural network system in accordance with the third preferred embodiment.

Neural network 34 in FIG. 12 comprises the input layer having three neuron elements, the intermediate layer having two elements, and the output layer having one element. One output from one of neurons in the input layer is returned back to an input of the same neuron. The input layer accepts pressing force change characteristic H from pressuring power change characteristic output means 40, welding current I, and welding voltage V.

Figure 13A:
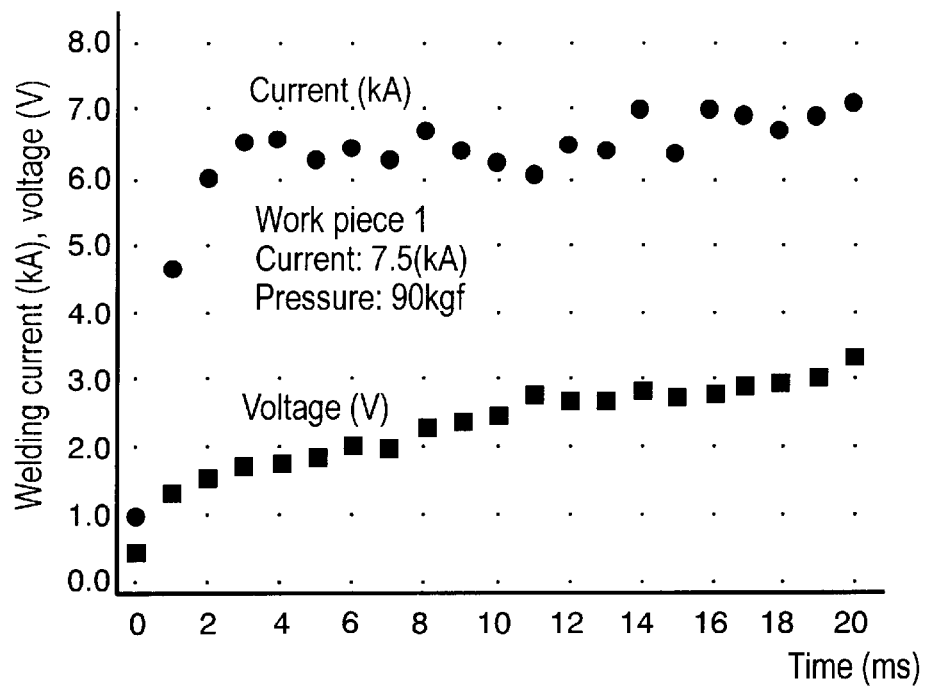
FIG. 13A shows an example of teacher data in accordance with the third preferred embodiment.
Figure 13B:
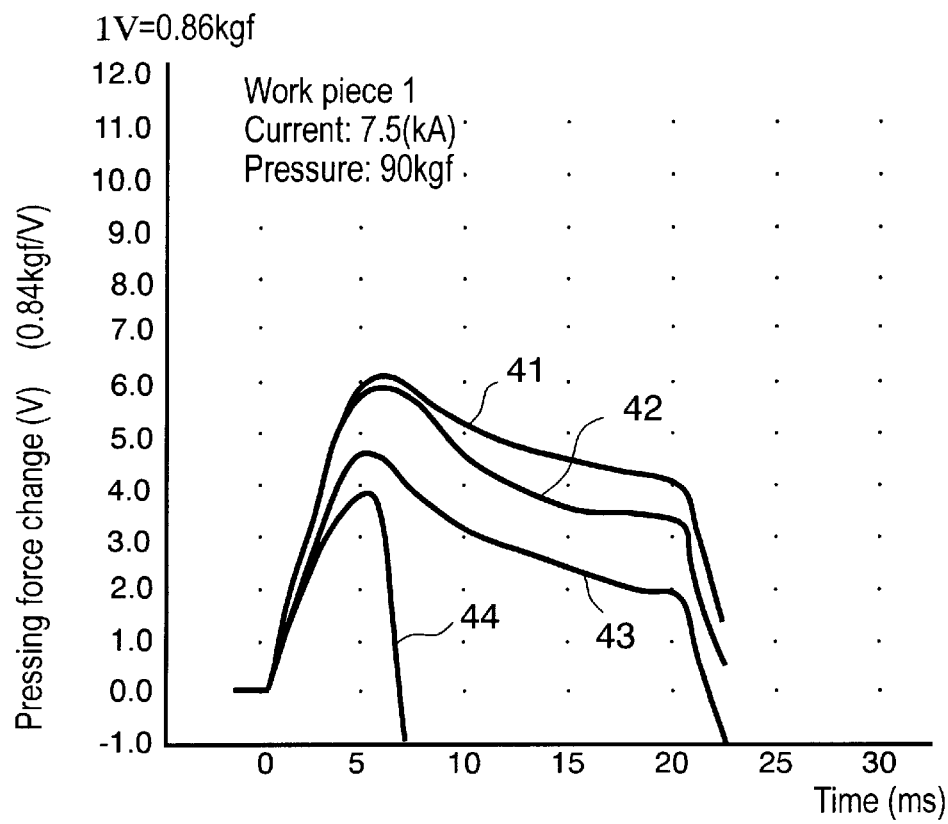
FIG. 13B shows another example of teacher data in accordance with the third preferred embodiment.

Characteristic H is obtained by normalizing, with respect to the maximum value that pressing force characteristic shown in FIG. 13B has reached, the value measured with 5 ms delayed from the maximum value-achieved point. After that, characteristic H is fed into neural network 34.

Neural network 34 is controlled so as to wait for the input of characteristic H with output C unchanged. Therefore, output controller 33 continues welding operations according to the welding condition determined by welding setting unit 32 until characteristic H is accepted.

Prior to welding, the neurons, which are supposed to accept welding current I and welding voltage V, have experienced learning process since the welding started. The learning process employs teacher data 36 and feedback coefficient A0 determined by learning unit 35. Weighted coefficients wij, vij are determined in advance by learning section 35 according to teacher data 36.

Receiving characteristic H, neural network 34 changes output C with predetermined such coefficients. Output controller 33 controls, according to output C, the welding current value for welding power source 31 to change welding conditions.

FIGS. 13A and 13B are examples of teacher data 6 of the embodiment.

As shown in FIG. 13A, a group of plural data of current and voltage during welding is fed into the neuron responsible for performing the learning process of neural network 34. In other words, plural kinds of data on current vs. welding time and voltage vs. welding time are fed into the neuron. Herein, the value represents tensile strength is employed for the criteria for evaluating a welding result and feedback coefficient A0 is defined—A0=0.94 for this embodiment.)

FIG. 13B shows a change in pressuring force during welding. It is apparent from FIG. 13B that pressuring power change characteristic changes as the position to be weld gets close to the edge of a work piece, changing the shape from curves 41 through 44.

With respect to the maximum value of pressuring force characteristic, characteristic H is obtained by normalizing the value measured with 5 ms delayed from the maximum value-achieved point, then fed into neural network 34.

A personal computer (PC) is employed for learning unit 35. The PC contains a history data-learning program and a learning program for calculating weighted coefficients for a static analog model—typical type comprising an input layer, an intermediate layer, and an output layer. The weighted coefficients are calculated by the back-propagation method.

With the prior art welding, an error in positioning of work pieces to be weld together has often occurred, as mentioned earlier, due to variations in their shapes. Besides, the welding done with the edge of a work piece has sometime caused spatters of melted metal, i.e. weld-expulsion, at the weld zone, sparking around the site. The expulsion could cause the spatters remained in the welding equipment, degrading the reliability of the equipment including a weld unit.

According to the embodiment, however, in the welding to be done at the edge of a work piece, the welding conditions—welding current, welding voltage, and electrode force—can be rapidly decreased suitable for the welding point, with the expulsion substantially eliminated. In addition, the welding strength achieved a satisfactory degree.

Although the embodiment employs pressuring power change characteristic for the learning process of a welding position, the amount of electrode displacement, i.e., the amount of movement of electrode is available for good effect. To obtain a higher leveled result, a CCD camera shooting is effective. According to the image of the welding position taken by the camera, the welding position can be directly fed into the neural network.

As described above, the present invention brings the following advantages.

1) providing a versatile control method responding with changes in complicate joining states (welding states).
2) accelerating the time for numerical calculations; realizing a higher control speed and a low-cost device required for numerical calculations; providing an economical and learning process-free control method.
3) minimizing the number of input items into a neural network; minimizing an error of the network output with fewer learning items, with the result that a joining equipment having high joining capability with an effective learning process.
4) realizing a more practical joining control.
5) providing a versatile joining control that can obtain a good result with higher accuracy.
6) providing an easy-handling of joining control equipment on a joining (welding) site, and a confirmation method of the working state of the equipment.
7) promising a higher joining quality and line tact.

What is claimed is:

1. A joining equipment for joining together a plurality of work pieces, the work pieces being joined together at a joining portion of each of the work pieces, the joining equipment comprising:

a) a detector for identifying a part of at least one of the work pieces undergoing a joining process;

b) a controller controlling an output of the joining equipment; and c) a neural network that accepts, with its input layer, an output signal from the detector, and provides a signal to the controller related to the part of the work piece undergoing the joining process, the controller controlling the output of the joining equipment at least partially based on the signal provided to the controller, wherein at least one output of neurons forming the neural network is returned back to an input of a neuron included in the neural network.

2. A joining equipment for joining together a plurality of work pieces, the work pieces being joined together at a joining portion of each of the work pieces, the joining equipment comprising:

a) a detector for identifying a part of at least one of the work pieces undergoing a joining process;

b) a controller controlling an output of the joining equipment; and c) a neural network that accepts, with its input layer, an output signal from the detector, and provides a signal to the controller related to the part of the work piece undergoing the joining process, the controller controlling the output of the joining equipment at least partially based on the signal provided to the controller, wherein the neural network is configured according to a solution of a thermal conduction equation.

3. The joining equipment as defined in claim 1 or claim 2, wherein the detector detects at least one of current for joining, voltage for joining, generated light, temperature, sound, changes in composition of the work pieces, and an amount of movement of electrodes, at the joining portion, for use in transmitting the output signal to the neural network.

4. The joining equipment according to claim 1 or claim 2, wherein the neural network calculates a joining strength characteristic value, the signal provided to the controller being at least partially based on the joining strength characteristic value.

5. The joining equipment according to claim 1 or claim 2, wherein the signal provided from the neural network to the controller is at least partially based on information related to discoloration of the work piece.

6. The joining equipment according to claim 1 or claim 2, wherein a coefficient in a characteristic equation of the neural network is adjusted based on an output of the neural network.

7. The joining equipment according to claim 1 or claim 2, additionally comprising a mechanism for applying pressure to the work pieces when they are joined together, and a coefficient in the characteristic equation of the neural network being changed responsive to at least one of i) a displacement between the work pieces; and ii) a pressing force, wherein both the displacement and the pressing force may be changed using the mechanism.

8. The joining equipment according to claim 1 or claim 2, wherein a coefficient in a characteristic equation of the neural network is adjusted based on information related to a temperature distribution of the joining portion.

9. The joining equipment according to claim 1 or claim 2, wherein the controller controls the output of the joining equipment to complete the joining process when the controller determines that an output characteristic value related to the joining process has reached a reference value of the neural network.

10. The joining equipment according to claim 1 or claim 2, wherein the controller controls the output of the joining equipment such that an output characteristic value related to the joining process gets closer to a reference value of the neural network.

11. The joining equipment according to claim 10, wherein the controller controls the output of the joining equipment such that at least one of current, voltage, power, pressing force, light, and heat input, measured at the joining portion is changed.

12. The joining equipment according to claim 1 or claim 2, wherein the controller calculates an amount of change in at least one joining condition for achieving a target reference value of an output characteristic related to the joining process based on at least one of: i) output history records of the output characteristic; ii) an estimated characteristic of change in voltage for joining during a joining procedure; and iii) an estimated characteristic of change in a temperature measured at the joining portion during a joining procedure.

13. The joining equipment according to claim 12, wherein the controller controls the output of the joining equipment such that at least one of current, voltage, power, pressing force, light, and heat input, at the joining portion is changed.

14. A joining equipment comprising:
a) a detector detecting a joining state of a joining portion when work pieces undergo a joining process;
b) a controller controlling an output of the joining equipment; and
c) a calculator receiving an output signal from the detector for use by the controller in controlling the output of the joining equipment,
wherein the calculator for providing data to the controller, performs a computation using an equation:

$$T(N) \cong (1 - \alpha \cdot k \cdot \Delta t / \Delta 1) T(0) + \Delta V \cdot I \cdot \Delta t / c \cdot \sigma \cdot S \cdot \Delta 1,$$

which is derived from a thermal conduction equation, where

T(N) is a temperature measured at the center of the joining portion;

T(0) is a temperature at the center of the joining portion measured time $\Delta t$ before;

$\alpha$ is a constant assuming that the heat moves and changes similarly in shape;

k is thermal conductivity for the work pieces;

$\Delta 1$ is thickness of the joining portion;

C is specific heat of the work pieces;

$\sigma$ is density;

S is a current path area;

$\Delta V$ is voltage for joining applied to the joining portion; and

I is current for joining fed through the joining portion.

15. The joining equipment of claim , wherein the detector detects at least one of current for joining, voltage for joining, generated light, temperature, sound, changes in composition of the work pieces, and an amount of movement of electrodes, at the joining portion, for transmitting to the calculator in the output signal from the detector.

16. The joining equipment according to one of claims 14 and 15, wherein the calculator produces an output for adjusting the coefficient a in the equation.

17. The joining equipment according to one of claims 14 and 15, additionally comprising a mechanism for applying pressure to the work pieces when they are joined together, and a coefficient in the characteristic equation of the neural network being changed responsive to at least one of i) a displacement between the work pieces; and ii) a pressing force, wherein both the displacement and the pressing force may be changed using the mechanism.

18. The joining equipment according to one of claims 14, and 15, wherein the detector detects a temperature distribution of the joining portion, the coefficient a in the equation being adjusted based on the temperature distribution.

19. The joining equipment according to one of claims 14 and 15, wherein the controller controls the output of the joining equipment to complete the joining process when the controller determines that an output characteristic value related to the joining process has reached a reference value of the neural network.

20. The joining equipment according to one of claims 14 and 15, wherein the controller controls the output of the joining equipment such that an output characteristic value related to the joining process gets closer to a reference value of the neural network.

21. The joining equipment according to claim 20, wherein the controller controls the output of the joining equipment such that at least one of current, voltage, power, pressing force, light, and heat input, at the joining portion is changed.

22. The joining equipment according to one of claims 14 and 15, wherein the controller calculates an amount of change in at least one joining condition for achieving a target reference value of an output characteristic related to the joining process based on at least one of: i) output history records of the output characteristic; ii) an estimated characteristic of change in voltage for joining during a joining procedure; and iii) an estimated characteristic of change in a temperature measured at the joining portion during the joining procedure.

23. The joining equipment according to claim 22, wherein the controller controls the output of the joining equipment such that at least one of current, voltage, power, pressing force, light, and heat input, at the joining portion is changed.

* * * * *

UNITED STATES PATENT AND TRADEMARK OFFICE
CERTIFICATE OF CORRECTION

PATENT NO.    : 6,518,536 B2
DATED         : February 11, 2003
INVENTOR(S)   : Koji Fujii et al.

It is certified that error appears in the above-identified patent and that said Letters Patent is hereby corrected as shown below:

<u>Column 16,</u>
Line 15, after "claim" insert -- 14 --.

Signed and Sealed this

Second Day of September, 2003

JAMES E. ROGAN
*Director of the United States Patent and Trademark Office*